United States Patent
Huang et al.

(10) Patent No.: US 7,355,991 B2
(45) Date of Patent: Apr. 8, 2008

(54) METHOD AND APPARATUS FOR MESSAGE FLOODING WITHIN A COMMUNICATION SYSTEM

(75) Inventors: Yan Huang, Weston, FL (US); Jian Huang, Coral Springs, FL (US); Matthew R. Perkins, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 1087 days.

(21) Appl. No.: 10/304,889

(22) Filed: Nov. 26, 2002

(65) Prior Publication Data

US 2004/0100957 A1 May 27, 2004

(51) Int. Cl.
*H04J 15/00* (2006.01)

(52) U.S. Cl. ............ 370/312; 370/313; 370/319; 370/338; 370/390; 370/400; 455/503

(58) Field of Classification Search ........... 370/312, 370/313, 314, 315, 321, 338, 390, 400, 448
See application file for complete search history.

(56) References Cited

U.S. PATENT DOCUMENTS

| | | | | |
|---|---|---|---|---|
| 5,038,403 A | * | 8/1991 | Leitch | 455/503 |
| 5,172,396 A | * | 12/1992 | Rose et al. | 375/356 |
| 5,423,059 A | * | 6/1995 | LoGalbo et al. | 455/503 |
| 5,815,814 A | * | 9/1998 | Dennison et al. | 455/456.2 |
| 5,924,042 A | * | 7/1999 | Sakamoto et al. | 455/458 |
| 5,930,248 A | * | 7/1999 | Langlet et al. | 370/347 |
| 5,963,868 A | * | 10/1999 | Baek | 455/503 |
| 6,011,977 A | * | 1/2000 | Brown et al. | 455/503 |
| 6,097,930 A | * | 8/2000 | Hill et al. | 340/7.26 |
| 6,161,022 A | * | 12/2000 | Hwang et al. | 455/561 |
| 6,266,536 B1 | * | 7/2001 | Janky | 455/503 |
| 6,438,376 B1 | * | 8/2002 | Elliott et al. | 455/437 |
| 6,909,706 B2 | * | 6/2005 | Wilmer et al. | 370/338 |
| 7,002,934 B2 | * | 2/2006 | Dolgonos et al. | 370/328 |
| 7,002,949 B2 | * | 2/2006 | Garcia-Luna-Aceves et al. | 370/351 |
| 7,016,336 B2 | * | 3/2006 | Sorensen | 370/351 |
| 2001/0005368 A1 | * | 6/2001 | Rune | 370/390 |

FOREIGN PATENT DOCUMENTS

EP 1037484 A1 * 9/2000

OTHER PUBLICATIONS

Perkins, Royer, Das, and Marina, "Performance Comparison of Two On-Demand Routing Protocols for Ad Hoc Networks", Feb. 2001, IEEE Personal Communications, p. 16-28.*
Perkins, Correal, and O'Dea, "Emergent Wireless Sensor Network Limitations: A Plea for Advancement in Core Technologies", Jun. 12-14, 2002, IEEE Proceedings of Sensors, p. 1505-1509.*

(Continued)

*Primary Examiner*—Hassan Kizou
*Assistant Examiner*—Brian T O'Connor

(57) ABSTRACT

A method and apparatus for message flooding is provided that takes advantage of the availability of node locations. The transmission of a flood message by a node is based on location information of neighboring nodes. In particular, each node within the communication system will delay retransmission of flood messages by a predetermined amount of time. If, during this delay, a node hears the flood message from a neighboring node (home flooding) or another node (neighborhood flooding), it then cancels transmission of the flood message.

7 Claims, 6 Drawing Sheets

OTHER PUBLICATIONS

Callaway, Gorday, Hester, Gutierrez, Naeve, Heile, and Bahl, "Home Networking with IEEE 802.15.4: A Developing Standard for Low-Rate Wireless Personal Area Networks", Aug. 2002, IEEE Communications Magazine, p. 70-77.*

Sze-Yao Ni, Yu-Chee Tseng, Yuh-Shyan Chen, and Jang-Ping Sheu "The Broadcast Storm Problem In A Mobile Ad Hoc Network" Mobicom 99, pp. 151-161, Seattle, Washington.

* cited by examiner

METHOD AND APPARATUS FOR MESSAGE FLOODING WITHIN A COMMUNICATION SYSTEM

FIELD OF THE INVENTION

The present invention relates generally to communication systems and in particular, to a method and apparatus for flooding within such communication systems.

BACKGROUND OF THE INVENTION

Message flooding within a communication system is well known. In particular, the message flooding procedure is often the basis of on-demand route discovery and network initialization. Message flooding is basically defined as a broadcast procedure covering a complete network. It operates as follows: When a node, or remote unit, in a network wishes to discover a route to another node in the network a message is broadcasted to all of its neighbors without specifying the destination address. Upon receiving the message, all of the neighboring nodes will rebroadcast the message to their neighbors. When a node receives the same message again, it discards it. The procedure repeats itself until all of the nodes in the network are reached. As discussed, the purpose to flood the network in a routing algorithm is essentially to find a path to send data to destinations or draw data from the sources. The message content is usually a request of route discovery.

Although message flooding is a dependable way to find a path within the network, flooding is proven to be the most expensive type of communication in wireless networks due to its broadcasting nature. The redundant broadcast caused by overlapping coverage amongst neighboring nodes wastes system resources, energy, and contributes to the excessive collisions. The redundant broadcast is more critical when executing flooding in a low-duty cycle mode because of the short communication windows and the use of coordination devices to schedule communications. In addition, a densely-deployed topology is another key factor to motivate the search for a new solution to address the redundant rebroadcast. Therefore, a need exists for a method and apparatus for message flooding within a communication system that minimizes redundant broadcasts caused by overlapping coverage.

DETAILED DESCRIPTION OF THE DRAWINGS

Figure 1:
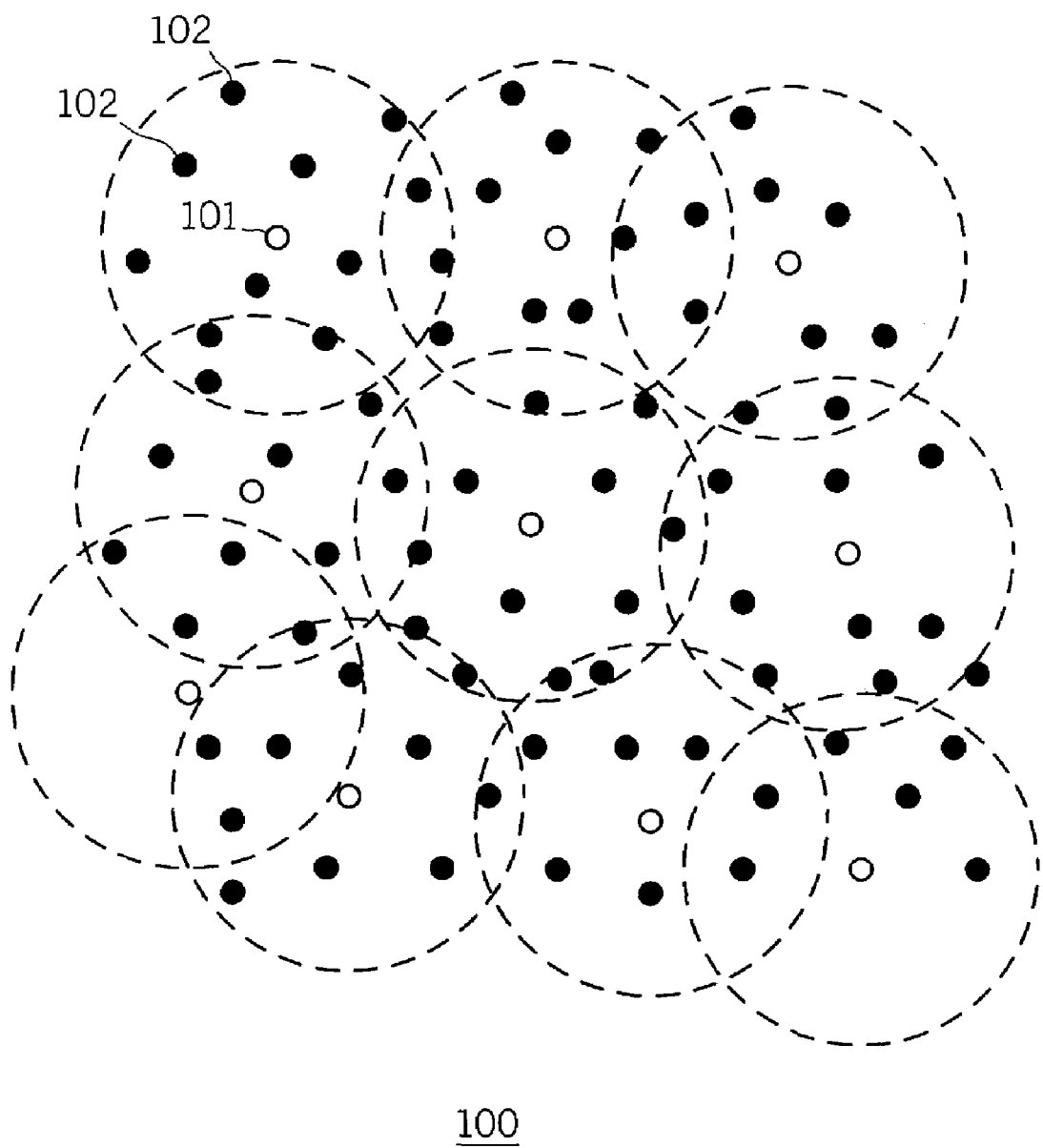
FIG. 1 is a diagram of a communication system in accordance with the preferred embodiment of the present invention.

To address the need for flooding within a communication system, a method and apparatus for flooding is provided herein. In accordance with the preferred embodiment of the present invention message flooding is provided that takes advantage of the availability of the node locations. The transmission of a flood message by a node is based on location information/coverage areas of neighboring nodes. In particular, each node within the communication system will delay retransmission of flood messages by a predetermined amount of time. If, during this delay, a node hears the flood message from another node, it then cancels or reschedules the transmission of the flood message.

During a home flooding scenario the delay, or back off period, is inversely proportional to a first area under the coordinator that a node can broadcast to, excluding a second area under the coordinator that the sender of the flood message can also broadcast to. Similarly, during a neighborhood flooding scenario the back off period is inversely proportional to a first area under the neighbor coordinator that a node can broadcast to, excluding a second area under both the home and neighbor coordinator that the node can broadcast to.

The above-described technique will allow as few as possible nodes that hear a flood message to rebroadcast the message, but still allows the full coverage of the network by the flood message. By reducing the number of nodes that rebroadcast, redundant flood messages are reduced, competitions in reservation windows that result in collisions are reduced, and traffic overhead is reduced.

The present invention encompasses a method for message flooding within a communication system. The method comprises the steps of receiving, by a remote unit, a message that potentially needs to be broadcast and determining a delay time for broadcasting the message, wherein the delay time is based on a coverage area of the remote unit.

The present invention additionally encompasses a method comprising the steps of receiving by a receiving node (B), a message transmitted from a transmitting node (A) and calculating a delay time for broadcasting the message. In the preferred embodiment of the present invention the delay time is based on a coverage area of the receiving node. The message is broadcast after the delay time if the message has not been broadcast by another node.

Finally, the present invention encompasses a receiving node for message flooding within a communication system. The receiving node comprises a receiver having as an input, a message that potentially needs to be broadcast, wherein the message was transmitted by a transmitting node, logic circuitry determining a delay time for broadcasting the message, wherein the delay time is based on a coverage area, and a transmitter outputting the message after the delay time has expired.

Prior to describing flooding in accordance with the preferred embodiment of the present invention the following definitions are provided to set the necessary background.

Home Flooding: The process for a node to broadcast a message through the coordination of the same coordinator that announces to it the original flood message
 Neighborhood Flooding: The process for a node to broadcast the flood message through a different coordinator to reach nodes under the different coordinator.

Turning now to the drawings, wherein like numerals designate like components, FIG. 1 is a diagram of communication system 100 in accordance with the preferred embodiment of the present invention. In the preferred embodiment of the present invention communication system 100 comprises an ad-hoc communication system such as a neuRFon™ communication system, available from Motorola, Inc. To maximize the lifetime of devices within communication system 100, devices operate in a low-duty cycle mode. Because of this, communication coordination becomes critical.

As shown, communication system 100 comprises a plurality of nodes 101 and devices 102. During the network initialization, an infrastructure is formed with a subset of nodes 101 (10 are shown in FIG. 1) that receive communication requests and announce communication schedules to their neighboring nodes. The description of the formation procedure is described in detail elsewhere. Nodes 101 are typically identified as Coordination Devices or coordinators, which facilitate low duty cycle coordinated communications in neuRFon™ networks. Any node 102 in such a network will be in the range of one or multiple coordinators 101.

Figure 2:
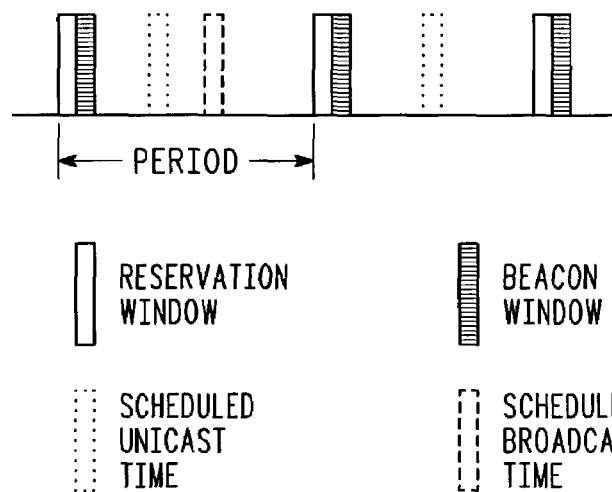
FIG. 2 and FIG. 3 illustrate transmission within the communication system of FIG. 1.

During typical transmission, a device (or node) 102 will schedule a time period to transmit through a given coordinator 101, and to receive through the given coordinator 101. This is illustrated in FIG. 2. As shown in FIG. 2, each coordinator 101 has a time window (reservation window) to receive its neighbors' 102 communication requests (for both unicast and broadcast) in each period. Each coordinator 101 additionally has a time window (beacon window) to broadcast schedules in each period, to its neighbors 102. The established network structure allows all neighboring nodes 102 to synchronize with its coordinator's reservation and beacon windows. Thus, in accordance with the preferred embodiment of the present invention, all nodes 101 and 102 must wake up in a beacon window to receive transmit/receive schedules. The durations of a reservation window and a beacon window, as well as any real communications, are very short compared with the length of a period. All devices 101 and 102 sleep at times other than these states, and low duty cycle is therefore achieved.

Figure 3:
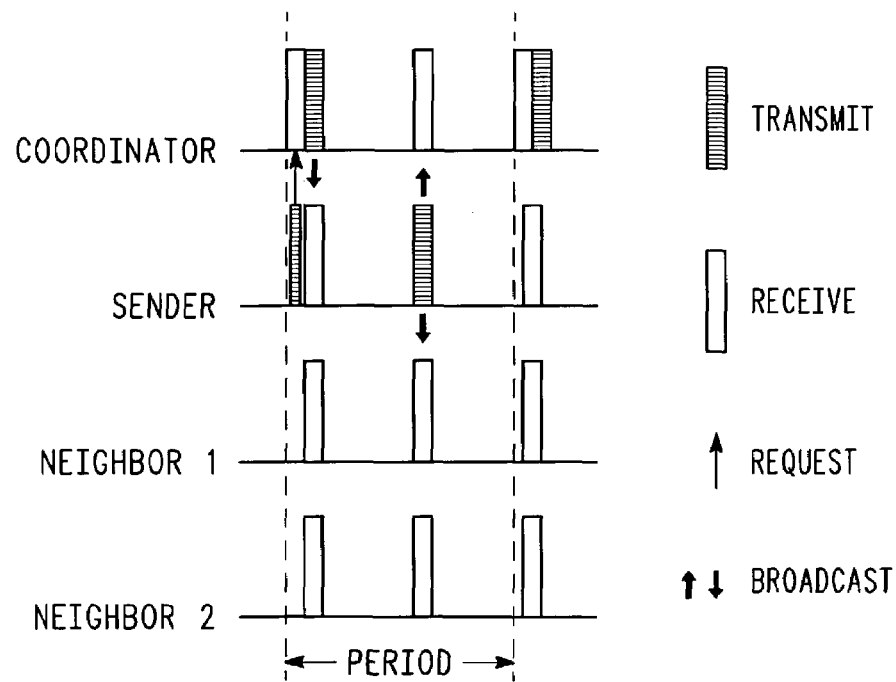

An example of broadcasting a message within communication system 100 is illustrated in FIG. 3. As shown, source node 102 sends a broadcast request to all coordinators 101 within its range within their reservation windows. A coordinator that receives the request announces in its next beacon window when the broadcast should happen. All nodes 102 that hear the announcement from a coordinator and are also the neighbors of the source node wakes up at the broadcast time and listen to the broadcast. Eventually all neighbors of the source node will receive the broadcast through coordinators in the source node's range.

As discussed above, message flooding is a dependable way to find a path within communication system 100, however, the redundant broadcast caused by overlapping coverage amongst neighboring nodes 102 wastes system resources, energy, and contribute to the excessive collisions. In order to address this issue, each node 102 within communication system 100 will delay retransmission of flood messages by a predetermined amount of time. If, during this delay, or back off period, a node hears the flood message from a neighboring node (home flooding) or another node (neighborhood flooding), then it cancels transmission of the flood message. In the preferred embodiment of the present invention, for home flooding the back off period is inversely proportional to a first area under the coordinator that a node can broadcast to, excluding a second area under the coordinator that the sender of the flood message can also broadcast to. Similarly, for neighborhood flooding the back off period is inversely proportional to a first area under the neighbor coordinator that a node can broadcast to, excluding a second area under both the home and neighbor coordinator that the node can broadcast to.

The above-described technique allows for broadcasting by largely reduced number of nodes 102 that hear a flood message while still allowing the full coverage of the network 100 by the flood message. By reducing the number of nodes 102 that rebroadcast, redundant flood messages are reduced along with competitions in reservation windows that result in collisions, and traffic overhead.

Home Flooding

As discussed above, all nodes 102 back off the rebroadcast of a received flood message, until they decide the time that they should rebroadcast or that there is no need to rebroadcast. In the preferred embodiment of the present invention the back off period for a particular node is inversely proportional to a first area under the coordinator that the node can broadcast to, excluding a second area under the coordinator that the sender of the flood message can also broadcast to. For example, for a coordinator (M) and a node that broadcasts the original message (A), a given node (B) will back off re-broadcasting the flood message for a period of time inversely proportional to:

$$\text{Area} = \text{Area}(M \cap B) - \text{Area}(M \cap B \cap A). \quad (1)$$

Thus, the larger the area, the shorter the back off period for the node. The back off time always ends at the beginning of a reservation window that node M can receive broadcast requests.

In the preferred embodiment of the present invention a unique identification (ID) is assigned to each flood message. This unique ID comprises a unique address of the originator of a flood message plus some sequence number generated by the originator as the unique ID. Additionally, each coordinator 101 will also record the number of rounds a specific message has been broadcasted using its own coordination. Therefore, for a specific flood message scheduled by a particular coordinator, the message can be identified as (coordinator ID, flood message ID, round ID). Additionally, when a node hears a flood message for the first time, the node will memorize this message as (sender ID, (coordinator ID, flood message ID, round ID)).

Flooding then takes place as follows:

Step 1: node B receives a flood message from node A through the scheduling of coordinator M. The message is (A, (M, originator.seq, M.rnd+1)). Node B then decides the back off time by using the value of Area $(M \cap B)$−Area $(M \cap B \cap A)$. Node B will wait this back off time before requesting a message rebroadcast of (B, (M, originator.seq, M.rnd+1)).

Step 2: Before the back off time is over, if node B hears the schedule from M for a message flood as (C, (M, originator.seq, M.rnd+1)), it means a node C has a larger new area coverage value than B, and C will take over the (M.rnd+1)$^{th}$ round of broadcasting for the flood message within the range of coordinator M. node B checks whether node C is its own neighbor.

Case 1: If C and B are neighbors, B quits any further attempt to rebroadcast this message within coordinator M's range.

Case 2: If node C is not node B's neighbor, node B will restart the back off period based on the area calculated earlier. However, the message it tries to rebroadcast changes its round number from M.rnd+1 to M.rnd+2. node B goes back to the beginning of Step 2 at this case.

Step 3. If node B does not hear any schedule from M related to the flood message until the back off time is over, it will send a request to M in order to rebroadcast (B, (M, originator.seq, M.rnd+1)), and then:

Case 1: If it receives a schedule for its rebroadcast from M, it will broadcast the message at the scheduled time and stop any further attempt to rebroadcast the same message again within M's range.

Case 2: If node B does not receive the schedule for rebroadcast by itself but receives a schedule for rebroadcast the message for the same round by a different node, it takes the actions as described in Step 2 as if the back off has not been over and it never sent its own rebroadcast request. Each time the coordinator should allow at most one rebroadcast request to the same message to proceed.

Case 3: If there is no schedule to rebroadcast the same message in M's beacon window, node B will reset the back off time for the same message as the beginning of the next reservation window. Node B goes to the beginning of Step 2 if it needs further attempt to rebroadcast this message.

Note that after receiving a flood message, a node will not wake up and listen to any future broadcasting of this message from other nodes in its range even if the schedule appears in any of its neighboring coordinators' beacon windows.

The process described above continues until there is no more rebroadcast attempts for the same message in the range of coordinator M. There will be no more attempts if any node in the range of M that has received this flood message meets either of the following conditions:

Condition 1: The node rebroadcasts the message once under the M's range (Step 3).

Condition 2: At least one of the node's neighbors in M's range (other than the neighbor that it first receives the broadcast of this message from) has already rebroadcast the same flood message (Step 2).

Condition 1 is the basic way to prevent any node from broadcasting the same message more than once in any flooding method. Condition 2 can easily be applied but it does not help if any node rebroadcasts a received flood message immediately. Therefore, the back off scheme is used to utilize these two conditions more efficiently to reduce the number of nodes that rebroadcast messages.

The new coverage area size is utilized as the back off criteria such that the node that can forward the message to the most new nodes (assuming uniform distribution of nodes) under a coordinator is always chosen to flood the message for the next round. Note that the optimal way is to calculate the new area by excluding any previous covered area under the coordinator. But in order to reduce the complexity at calculating this area at a given node B, Formula (1) is utilized considering only coverage of three nodes: the coordinator M, node A where the flood message comes from to B, and the node B itself.

Any next round broadcasting will cause some nodes to be covered more than once, which triggers Condition 2 and stop some nodes' attempt. Because these nodes have been covered more than once, they are likely to overlap more with the previous senders' coverage area. Therefore, for the node that has not been covered more than once, it is likely that it will cover more new area if it is chosen next round. The area that has never been covered or covered only once should decrease quickly by always choosing such a node to rebroadcast. The total number of nodes that actually rebroadcast should be greatly reduced compared with letting all nodes rebroadcast once, because many nodes' rebroadcast can be avoided due to the overlapping of covered areas.

Figure 4:
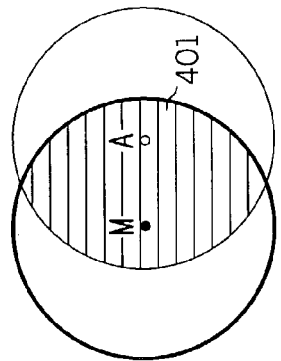
Figure 9:
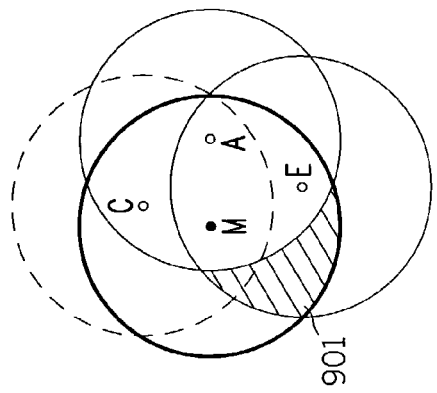
Figure 8:
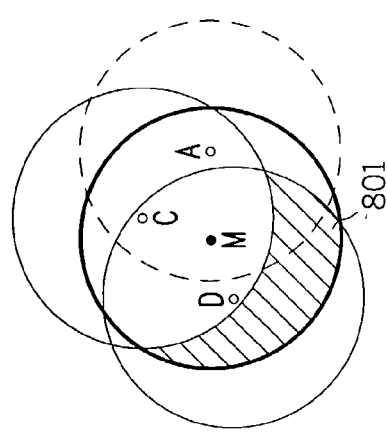
Figure 7:
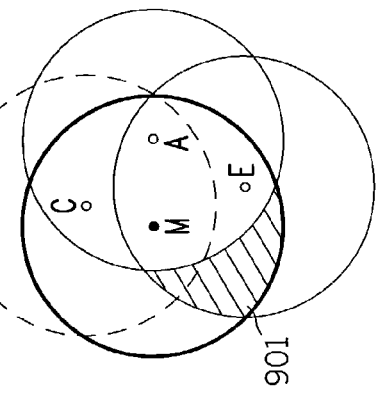
Figure 10:
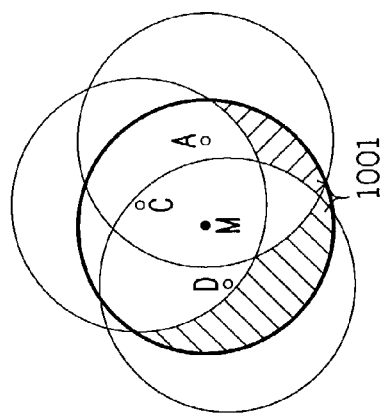

FIG. 4 through FIG. 14 illustrates home flooding in accordance with the preferred embodiment of the present invention, with circles surrounding a particular node representing the coverage area of that node. As shown in FIG. 4, node A floods a message through the coordination of node M. The nodes in M∩A (401) receive the message and will try to rebroadcast.

Figure 6:
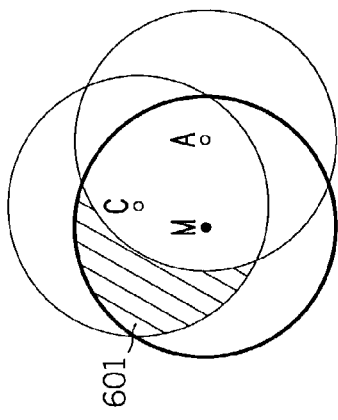
FIG. 4 through FIG. 16 illustrates flooding in accordance with the preferred embodiment of the present invention.
Figure 5:
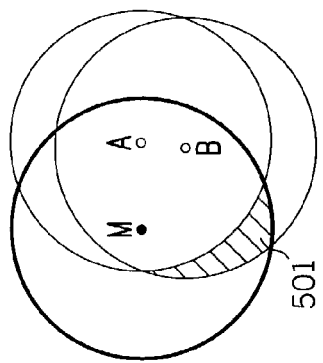

As shown in FIG. 5 and FIG. 6, nodes B and C are both in the area of $M^{TM}A$. Area 501 in FIG. 5 represents the new area covered by B using Formula (1). Similarly area 601 in FIG. 6 represents the new area covered by C using Formula (1). B and C decide the back off time based on the calculated new area.

Because C covers a larger new area 601, it schedules next round of broadcast before B's back off finishes. Therefore, it rebroadcasts the message and B quits any further attempt to rebroadcast the message because it is also a neighbor of C. Area 701 (FIG. 7) identifies the total covered areas that only hear the flood message once.

Node D and E belong to area 701 and only hear the flood message once. Therefore, they decide how long to back off based on the areas 801 and 901 (FIG. 8 and FIG. 9) calculated using Formula (1). Because D covers a larger new area, it schedules a next round of broadcast before E's back off finishes. Therefore, it rebroadcasts the message and E quits any further attempt to rebroadcast the message because it is a neighbor of D. Area 1001 of FIG. 10 refers to the total covered areas that only hear the flood message once.

Figure 11:
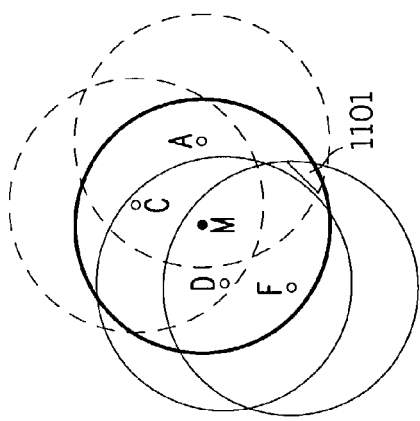
Figure 12:
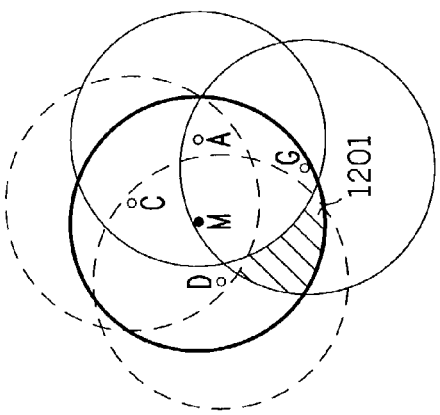
Figure 13:
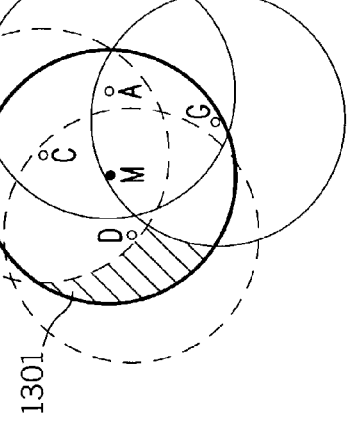

Referring to FIG. 11 and FIG. 12, node F and G belongs to the areas 1001 that only hear the flood message once. Therefore, they decide how long to back off based on areas 1101 and 1201 calculated using Formula (1). Because G covers a larger new area, it schedules next round of broadcast before F's back off finishes. Therefore, it rebroadcasts the message and F quits any further attempt to rebroadcast the message because it is a neighbor of G. Area 1301 of FIG. 13 refers to the total covered areas that only hear the flooding once.

Figure 14:
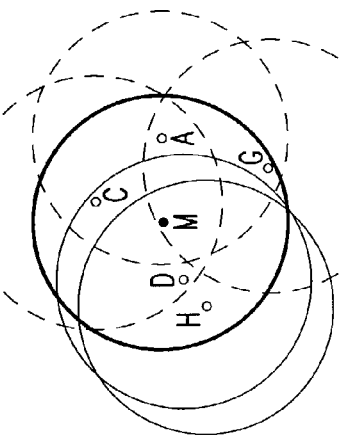

Finally, referring to FIG. 14, node H belongs to area 1301 that only hears the flood message once. Therefore, node H decides how long to back off based on the area calculated using Formula (1). Suppose H's back off finishes and its rebroadcast is scheduled, then all nodes under M have heard the flooding more than once. Therefore, no node will try to rebroadcast the same message.

Thus in accordance with the preferred embodiment of the present invention a total of four nodes have been used to rebroadcast the message within node's M's range in the above example. When compared to prior-art flooding where the same message are broadcast by all neighbors of node M at least once, the situations caused by the problems described earlier can be greatly improved.

Neighborhood Flooding

In the preferred embodiment of the present invention neighborhood flooding optimization works similarly to the above-described home flooding procedure. As discussed above, neighborhood flooding occurs when a node rebroadcasts a flood message through a different coordinator to reach neighbors under the different coordinator. In this scenario, when node A receives a flood message through the coordination of node M, and node A is in the range of another coordinator N, node A will try to send a request to node N in order to rebroadcast this message to its neighbors that are also in the range of N. Instead of sending the request immediately, node A will also back off for a period of time decided by the following formula:

$$\text{Area}(N \cap A) - \text{Area}(N \cap A \cap M) \quad (2)$$

If node A does not hear any other node's schedule of rebroadcast the same message through node N before its back off is over, it will send request to node N to rebroadcast this message. If it hears any broadcast schedule of the same message through N (no mater whether the sender is a neighboring node or not), node A will stop rebroadcast this message. Hereafter, the algorithm used by all nodes under coordinator N is the same as the algorithms used in home flooding.

Figure 15:
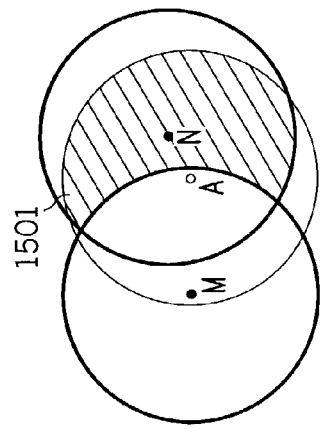
Figure 16:
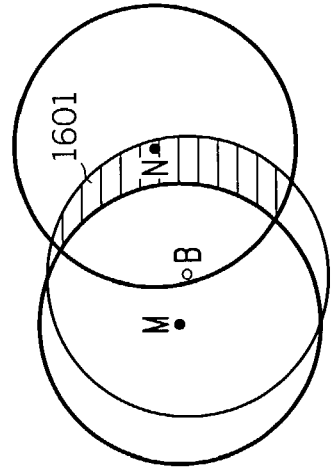

As an example, in FIG. 15 and FIG. 16, both A and B receive a flood message through the coordination of M and they are both in the range of coordinator N. So both nodes will try to flood the same message in the range of N. A's new coverage under N other than the part that as been covered by M (area 1501) is larger than the corresponding area of B (area 1601). Therefore, node A will rebroadcast the message through N first. B will stop trying. From this point any further flooding inside the range of N will follow the steps given in home flooding.

Home Flooding Back Off Time

The algorithm may choose to use Formula (3) to decide the back off time for home flooding. In the formula, M is the coordinator, A is the flood message sender, and B is the node that calculates the back off time.

$$\left| \text{Density} \times \text{Area}(M \cap A) \times \left(1 - \frac{\text{Area}(M \cap B) - \text{Area}(M \cap B \cap A)}{\text{Area}(M - M \cap A)}\right) \right| \quad (3)$$

In Formula (3), Area (M-M∩A) refers to the maximal new covered area under M's range by any node that is in M∩A, which receives a flood message from A. Furthermore, Density×Area (M∩A) estimates the total number of nodes under M that receive the flood message from A. These two values are constant for all nodes in M∩A. As described earlier, Area (M∩B)—Area (M∩B∩A) refers to the new covered area under M's range by node B. This formula will estimates to an integer number from 0 to the number of nodes in M∩A. The smaller is the new coverage area, the larger is the value of Formula (3). If a node's new coverage area equals the maximal new coverage, Formula (3) will have a value of 0.

The calculated value decides how many more beacon windows to wait before sending node B's rebroadcast request to M. If no other node's rebroadcast through the coordination of node M covers node B when all these beacon windows past, node B sends its own rebroadcast request to M in the next available reservation window of node M.

H. Neighborhood Flooding Back Off Time

The algorithm may choose to use Formula (4) to decide the back off time for neighborhood flooding. In the formula, N is the new coordinator, M is the previous coordinator, and A is the node that calculates the back off time.

$$\left| \text{Density} \times \text{Area}(N \cap M) \times \left(1 - \frac{\text{Area}(N \cap A) - \text{Area}(N \cap A \cap M)}{\text{Area}(N - N \cap M)}\right) \right| \quad (4)$$

In Formula (4), Area (N-N∩M) refers to the maximal new covered area under N's range by any node that is in N∩M, which receives a flood message through the coordination of node M and then tries to rebroadcast the same message to other neighbors through the coordination of node N. Furthermore, Density×Area (N∩M) estimates the total number of nodes under M that will try to rebroadcast through the coordination of node N. These two values are constant for all nodes in N∩M. Similar to home flooding, Area (N∩A)—Area (N∩A∩M) refers to the new covered area under N's range by node A other than the area covered by node M. This formula will estimates to a number from 0 to the number of nodes in N∩M. The smaller is the new coverage area, the larger is the value of Formula (4). If a node's new coverage area under N equals the maximal new coverage, Formula (4) will have a value of 0.

The calculated value decides how many more beacon windows to wait before sending node A's rebroadcast request to N. If no other node rebroadcasts through the coordination of node N when all these beacon windows past, node A sends its own rebroadcast request to N in the next available reservation window of node N.

Area Calculation

As is evident, physical locations and radio transmission range of all nodes 101 and 102 within network 100 are essential information for the area calculations. In the preferred embodiment of the present invention location is accomplished as described in U.S. Pat. No. 6,473,038 "Method and Apparatus for Location Estimation" and pending U.S. patent application Ser. No. 10/040,610 "Method for Determining Location Information".

Assume each node knows their own two dimensional physical location and the radio transmission range is known and fixed, each node is required to attach its own location information when it broadcasts or rebroadcasts a flood message. Each node also knows the locations of its coordinators. Therefore, a node can always apply the location information of itself, the coordinator, and the node that sends it the flood message in area calculations.

Figure 18:
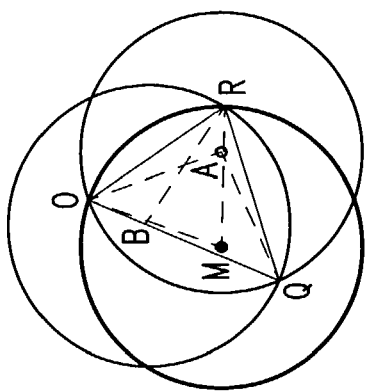
FIG. 17 and FIG. 18 illustrate area calculation in accordance with the preferred embodiment of the present invention.
Figure 17:
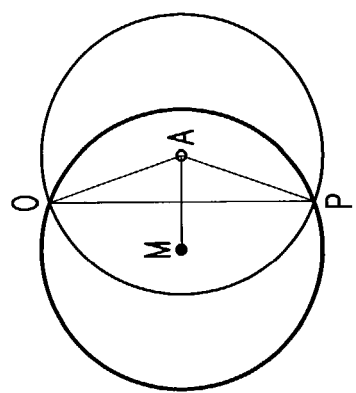

The area calculation used in Formulas (1) to (4) involves calculating the size of overlapped areas of two and three circles. FIG. 17 and FIG. 18 show how to calculate overlapped areas of two and three circles. Particularly, $$\text{Area}(M \cap B \cap A) = 2 \times (\text{Area}(\text{Sector AOP}) - \text{Area}(\text{Triangle AOP})); \quad (5)$$

$$\text{Area}(M \cap B \cap A) = \text{Area}(\text{Sector AOQ}) - \text{Area}(\text{Triangle AOQ}) + \text{Area}(\text{Sector BQR}) - \text{Area}(\text{Triangle BQR}) + \text{Area}(\text{Sector MOR}) - \text{Area}(\text{Triangle MOR}) + \text{Area}(\text{Triangle OQR}). \quad (6)$$

The areas of the sectors and triangles shown in Formulas (5) and (6) can be easily derived from nodes M, A and B's physical locations, the radius of the circles (transmission range), and the distances between nodes.

Figure 19:
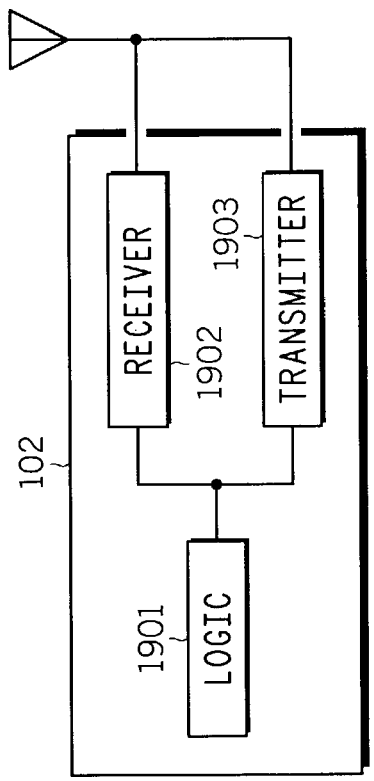
FIG. 19 is a block diagram of a transmitting/receiving device of FIG. 1.
Figure 20:
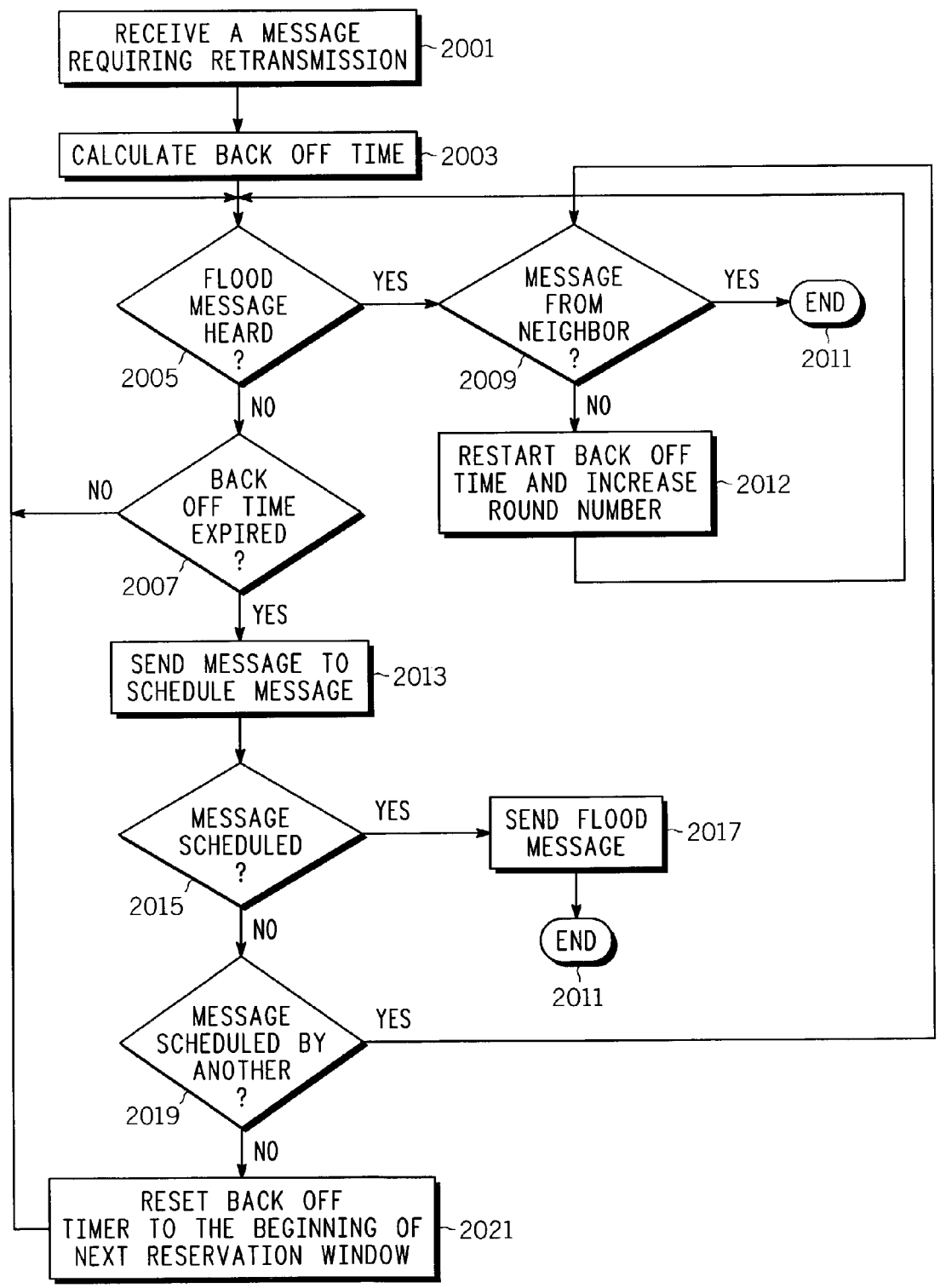
FIG. 20 is a flow chart showing operation of the device of FIG. 19 in accordance with the preferred embodiment of the present invention.

FIG. 19 is a block diagram of node, or remote unit 102 of FIG. 1 in accordance with the preferred embodiment of the present invention. node 102 comprises a standard neuR-Fon™ remote unit configured with logic circuitry 1901 to perform the function set forth herein. As shown node 102 also comprises receiver 1902 and transmitter 1903. FIG. 20 is a flow chart showing operation of node 102 of FIG. 19.

The logic flow begins at step 2001 where receiver 1902 receives a message that potentially needs to be rebroadcast. In the preferred embodiment of the present invention the message comprises a flood message transmitted from a transmitting node, however in alternate embodiments of the present invention the message may comprise any message type that requires units to retransmit the message.

At step 2003 logic unit 1901 calculates a delay, or back off time, to retransmit the message. As discussed above, the delay time is based on a coverage area of the receiving node (remote unit 102), and for home flooding, is inversely proportional to a first area under the coordinator that remote unit 102 can broadcast to, excluding a second area under the coordinator that the sender of the flood message can also broadcast to. For neighborhood flooding the delay time is inversely proportional to a first area under the neighbor coordinator that a node can broadcast to, excluding a second area under both the home and neighbor coordinator that the node can broadcast to. At step 2005, and prior to the back off time being over, logic unit 1901 determines if the flood message has been heard from another node, and if not the logic flow continues to step 2007, otherwise the logic flow continues to step 2009. It should be noted that for neighborhood flooding, the logic flow skips step 2009 and simply ends at step 2011.

At step 2009 logic unit 1901 determines if the message was from a neighbor, and if so, the logic flow ends at step 2011 (flood message is not rebroadcast), otherwise the logic flow continues to step 2013 where the back off period is restarted and the round number is changed. The logic flow then returns to step 2005.

At step 2007 it is determined if the back off time has expired, and if not the logic flow returns to step 2005. If, at step 2007 the back off time has expired, then the logic flow continues to step 2013 where a request to rebroadcast the message is sent. At step 2015 it is determined if the message has been scheduled, and if so, the message is broadcast (step 2017) and the logic flow ends at step 2011. If, however, at step 2015 it is determined that the message has not been scheduled, then the logic flow continues to step 2019 where it is determined if the message has been scheduled by another node. If, at step 2019 it is determined the message has been scheduled by another node, the logic flow returns to step 2009, otherwise the logic flow continues to step 2021. At step 2021 the back off timer is reset to the beginning of next reservation window and the logic flow returns to step 2005.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the steps of:
   receiving by a receiving node (B), a message transmitted from a transmitting node (A) as part of a message flood;
   calculating a delay time for broadcasting the message, wherein the delay time is inversely proportional to a coverage area under the receiving node;
   determining if the message has been broadcast by another node;
   broadcasting the message as part of the message flood after the delay time if the message has not been broadcast by another node; and
   wherein the step of calculating the delay time comprises one of the following two steps:
   calculating a delay time inversely proportional to a first area under a neighbor coordinator (N) that the remote unit can broadcast to, excluding a second area under both a home (M) and the neighbor coordinator that the remote unit can broadcast to; or
   calculating a delay time inversely proportional to a first area under a coordinator (M) that the receiving node can broadcast to, excluding a second area under the coordinator that the transmitting node can broadcast to.

2. The method of claim 1 wherein the step of determining if the message has been broadcast by another node and broadcasting the message after the delay time if the message has not been broadcast by another node comprises the steps of:
   determining if the message has been broadcast by a neighboring node; and
   broadcasting the message after the delay time if the message has not been broadcast by the neighboring node.

3. The method of claim 1 wherein the step of calculating the delay time comprises the step of calculating a delay time inversely proportional to Area $(N \cap B)$-Area $(N \cap B \cap A)$.

4. The method of claim 1 wherein the step of calculating a delay time comprises the step of calculating a delay time inversely proportional to Area $(M \cap B)$-Area $(M \cap B \cap A)$.

5. An apparatus for message flooding within a communication system, the apparatus comprising:
   a receiver having as an input, a message that needs to be broadcast as part of a message flood, wherein the message was transmitted by a transmitting node;
   logic circuitry determining a delay time for broadcasting the message, wherein the delay time is inversely proportional to a coverage area;
   a transmitter outputting the message as part of message flooding after the delay time has expired; and
   wherein the delay time is inversely proportional to a first area under a coordinator (M) that the receiving node can broadcast to, excluding a second area under the coordinator that the transmitting node can broadcast to, or the delay time is inversely proportional to a first area under a neighbor coordinator that the remote unit can broadcast to, excluding a second area under both a home and the neighbor coordinator that the remote unit can broadcast to.

6. The apparatus of claim 5 wherein the transmitter outputs the message after the delay time has expired only if the message has not been broadcast by another node.

7. The apparatus of claim 6 wherein the transmitter outputs the message after the delay time has expired only if the message has not been broadcast by a neighboring node.

* * * * *

UNITED STATES PATENT AND TRADEMARK OFFICE
CERTIFICATE OF CORRECTION

PATENT NO. : 7,355,991 B2  Page 1 of 1
APPLICATION NO. : 10/304889
DATED : April 8, 2008
INVENTOR(S) : Yan Huang et al.

It is certified that error appears in the above-identified patent and that said Letters Patent is hereby corrected as shown below:

In Column 8, Line 43, in Equation (5), delete "Area(M∩B∩A)" and insert
-- Area(M∩A) --, therefor.

Signed and Sealed this

Thirtieth Day of June, 2009

JOHN DOLL
*Acting Director of the United States Patent and Trademark Office*